United States Patent

Yonetani et al.

[11] Patent Number: 6,015,845
[45] Date of Patent: Jan. 18, 2000

[54] BINDER FOR BUILDING STRUCTURE

[75] Inventors: Masayuki Yonetani; Seiji Nishida, both of Nobeoka, Japan

[73] Assignee: Asahi Kasei Kogyo Kabushiki Kaisha, Osaka, Japan

[21] Appl. No.: 09/077,537

[22] PCT Filed: Nov. 7, 1996

[86] PCT No.: PCT/JP96/03271

§ 371 Date: Jun. 1, 1998

§ 102(e) Date: Jun. 1, 1998

[87] PCT Pub. No.: WO98/20085

PCT Pub. Date: May 14, 1998

[30] Foreign Application Priority Data

Nov. 16, 1995 [JP] Japan .................................. 7-298380

[51] Int. Cl.[7] .............................. C09J 4/00; C09J 163/10
[52] U.S. Cl. ......................... 523/130; 523/400; 523/455; 523/461; 525/65
[58] Field of Search ..................... 523/130, 400, 523/455, 461; 525/65

[56] References Cited

U.S. PATENT DOCUMENTS 4,296,006  10/1981  Bugdahl et al. .
4,518,283   5/1985  Gebauer et al. .
4,729,696   3/1988  Goto et al. .

FOREIGN PATENT DOCUMENTS 2-199671   10/1986  European Pat. Off. .
61-163914   7/1986  Japan .
61-254681  11/1986  Japan .
64-31706    2/1989  Japan .
2-308876   12/1990  Japan .
4-27528     1/1992  Japan .

*Primary Examiner*—Nathan M. Nutter
*Attorney, Agent, or Firm*—Birch, Stewart, Kolasch & Birch, LLP

[57] ABSTRACT

The present invention relates to a binder for a building structure comprising a main ingredient, a curing agent and an accelerator for the main ingredient; the main ingredient being an epoxy acrylate resin diluted with a reactive monomer comprising a multifunctional ester of carboxylic acid and alcohol, at least one of which contains a reactive double bond; the curing agent being an organic peroxide; and the accelerator of the main ingredient being tertiary aromatic amines containing a hydroxyl group in a nitrogen substituent.

6 Claims, No Drawings

BINDER FOR BUILDING STRUCTURE

This application claims the benifit under 35 U.S.C. §371 of prior PCT International Application No. PCT/JP96/03271 which has an International filing date of Nov. 7, 1996 which designated the United States of America, the entire contents of which are hereby incorporated by references.

TECHNICAL FIELD OF THE INVENTION

The present invention relates to a binder for a building structure which is used for fixing fastening parts such as an anchor bolt in a hole drilled to a base such as concrete and rock. Particularly, it relates to a non-styrene monomer type binder which exhibits high strength and excellent stability even under high or low temperature circumstances.

BACKGROUND ART

Conventionally, capsule or charging type binders have been used to fix fastening parts such as an anchor bolt to a base material.

When a capsule type binder is employed, fastening parts are fixed by inserting a capsule containing a binder into a drill hole, breaking the capsule by rotary percussioning an anchor bolt or the like to mix the main element of the binder and a curing agent in the capsule. As the binders applicable to this method, there have been known a capsule type binder containing an epoxy acrylate resin as the main component of the main ingredient as disclosed in Japanese Patent Application Publication No. 37076/1987, an adhesive agent comprising an epoxy acrylate type resin disclosed in Japanese Patent Application Laid-Open No. 243876/1986 and a binder comprising a mixture of a high fatty acid ester with an epoxy acrylate resin as disclosed in Japanese Patent Application Laid-Open No. 254681/1986. There is also known a binder containing an acryl type epoxy acrylate resin as the main ingredient and N,N-dihydroxypropyl-p-toluidine as an accelerator.

The latter charging type binder includes one mixed at a construction site and one contained in a cartridge. When the former charging type binder is employed, fastening parts are fixed by mixing the main ingredient and the curing resin at the construction site and then charging it into a drill hole. When the latter is employed, the fastening parts are fixed by adequately discharging the main ingredient and the curing agent in the cartridge portionwise using a hand gun, oil pressure and the like, and then charging a binder mixed by means of a mixer such as a static mixer in a drill hole. As the latter binder, one disclosed in Japanese Patent Application Laid-Open No. 24714/1984 is known. This binder comprises an unsaturated polyester resin, a reactive diluent, a filler, a thixotropic agent and a radical curing agent.

The main ingredient to be used for these binders contains a reactive monomer and is diluted to an adequate viscosity. As the reactive monomer, a styrene monomer is widely used. However, the styrene monomer is a hazardous material (second group of quaternary oil), and is also such a substance that is classified in an organic solvent by the Industrial Safety Hygienic Rule. Therefore, a non-styrene type main ingredient, i.e., a main ingredient free from a styrene monomer, has been highly demanded, and a "Capsule for Fixing Bolts" disclosed in Japanese Patent Application Laid-Open No. 27528/1992 is known as a capsule type binder using this type of main ingredient, i.e., non-styrene type main ingredient.

However, conventional non-styrene type main ingredients have a drawback in that the ingredients cannot be adjusted to a suitable hardness. Accordingly, it is very difficult to use them under circumstances wherein fastening parts cannot be firmly fixed if a binder is not cured within a certain period, e.g., under high temperature circumstances (low latitudes and summertime), under low temperature circumstances (high latitudes and wintertime), and in water (rain, river and sea). Further, resin stability until the use of binders is also required.

The present invention aims at avoiding the above problems and providing a binder for building structures which exhibits stable adhesive strength in various circumstances and is excellent in resin stability.

DISCLOSURE OF THE INVENTION

The present invention relates to a binder for building structures which comprises a main ingredient, a curing agent; and an accelerator of the main ingredient the main ingredient being an epoxy acrylate resin diluted with a reactive monomer comprising a malfunctional esters of a carboxylic acid and alcohol, at least one of which contains a reactive double bond; the curing agent being an organic peroxide; and the accelerator for the main ingredient being a tertiary aromatic amine containing a hydroxyl group in a nitrogen substituent.

The epoxy acrylate resin employable in the present invention is an addition reaction product of an epoxy resin and an unsaturated monobasic acid. The product may contain an unsaturated polyester resin and an epoxy resin in an amount which does not deteriorate its effect.

The epoxy resin includes diglycidyl ether of bisphenol A type, bisphenol AD type, bisphenol S type, bisphenol F type, novolak type, biphenyl type, naphthalene type, phthalic acid type, hexahydrophthal type and benzoic acid type, diglycidyl ether of glycol type, and the like. In general, bisphenol A type diglycidyl ether is used.

The unsaturated monobasic acid includes acrylic acid, methacrylic acid, crotonic acid, cinnamic acid, sorbinic acid, hydroxyethyl methacrylate maleate, hydroxyethyl acrylate maleate, hydroxypropyl methacrylate maleate, hydroxypropyl acrylate maleate, and the like. In general, the preferred is a methacryl type epoxy acrylate resin containing methacrylic acid, hydroxymethacrylate maleate, hydroxypropyl methacrylate maleate and the like which are excellent in alkali resistance.

The reactive monomers employable in the present invention are esters of carboxylic acid and alcohol. One or both of the carboxylic acid and alcohol are a multifunctional component containing a reactive double bond. Such esters include, for example, ethylene glycol methacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylol propane trimethacrylate, diallyl phthalate, triallyl trimellitate, and a dicyclopentane diene type compound represented by the following formula (1) or (2).

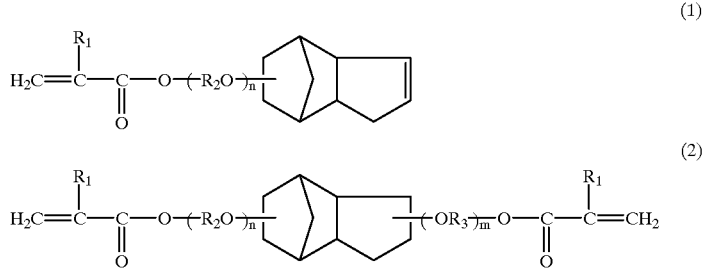

(1)

(2)

wherein $R_1$ represents a hydrogen atom and a methyl group; $R_2$ and $R_3$ represent ethylene, butylene and the like; n and m are an integer of 0 to 5. Of these, esters comprising methacrylic acid and methacryl alcohol are preferred because of their excellent alkali resistance. These reactive monomers may be used individually or in combination. Further, monofunctional esters can be mixed as long as they are mixed in a small amount.

The mixing ratio of the reactive monomer to the epoxy acrylate resin is not particularly limited, but preferably 10 to 70% by weight, more preferably 30 to 70% by weight, most preferably 40 to 60% by weight. Further, it is preferable to mix them so that the resin viscosity may be 0.1 to 200 poise (E type viscometer at 25° C.).

The curing agents usable in the present invention are organic peroxides such as diacryl peroxides, ketone peroxides, hydroperoxides, dialkyl peroxides, peroxyketals, alkyl peresters and peroxycarbonates. For example, they include benzoyl peroxides, methylethylketone peroxide, lauryl peroxide, dicumyl peroxide, cumene hydroperoxide and the like. Most generally, benzoyl peroxide is used.

The curing agent is usually diluted with a diluent for use. As a diluent for the curing agent, there can be used an inorganic matter such as calcium sulfate and calcium carbonate, dimethylphthalate, dibutylphthalate, dicyclohexylphthalate, dioctylphthalate, aliphatic hydrocarbon, aromatic hydrocarbon, silicone oil, a liquid paraffin polymerizable monomer, water and the like.

The accelerator usable in the present invention may be a tertiary aromatic amine containing a hydroxyl group in a nitrogen substituent, for example, N,N-dihydroxypropyl-p-toluidine, N-phenyldiethanol amine, N-p-tolyldiethanol amine, N,N-bishydroxybutyl-p-toluidine and the like. N,N-bishydroxypropyl-p-toluidine is preferred since it exhibits an effect with a small amount. As long as the accelerator does not contact the curing agent directly, it may be mixed either with the main ingredient upon use or with the resin preliminarily. The addition amount of the accelerator is about 0.5 to 5% by weight based on the amount of the resin, preferably 0.5 to 1.5% by weight. These accelerators may be used individually or in combination. Further, they may be used with conventional accelerators such as N,N-dimethylaniline and cobalt naphthenate, which have been commonly used.

Further, the main ingredient can be mixed with a polymerization inhibitor, a coloring agent, a pigment, an ultraviolet light absorber, a surfactant, an aggregate, a filler, a thixotropic agent and the like, if necessary. The curing agent also can be mixed with an aggregate, a filler, a thixotropic agent, a diluent, a plasticizer and the like, if necessary.

The polymerization inhibitor to be used in the present invention includes quinones, hydroquinones, phenols and the like. More specifically, it includes benzoquinone, p-benzoquinone, p-toluquinone, p-xyloquinone, naphthoquinone, 2,6-dichloroquinone, hydroquinone, p-t-butylcatechol, 2,5-di-t-butylhydroquinone, monomethylhydroquinone, p-methoxyphenol, 2,6-di-t-butyl-p-crezol, hydroquinone monomethylether and the like. These polymerization inhibitors can be suitably added in a required amount. Hydroquinones and phenols are preferable since they are not deteriorated by coloring and the like when mixed with amines. Most effective as polymerization inhibitors are crezols.

The coloring agent, pigment and ultraviolet light absorber are added, if necessary, as a light-resistant stabilizer which inhibits gelation of resins by solar rays or the like. These additives include a lake pigment, an azo pigment, a phthalocyanine pigment, a high organic pigment, an inorganic pigment and a mixture thereof. For example, there can be added "Toner Yellow", "Toner Brown" and "Toner Green" (manufactured by Takeda Chemical Industries, Ltd.), "Color Tex Brown", "Color Tex Orange" and "Color Tex Maroon" (manufactured by Sanyo Color Works, Ltd.) and "OPLAS YELLOW" (manufactured by Orient Chemical Industries Ltd.). The addition amount cannot be easily determined since the types of the resin contained in the main ingredient, the monomer type and the effect of the additives are different.

The surfactant employable in the present invention includes anionic, cationic, nonionic and ampholytic surfactants. Of these, an anionic surfactant is preferable since it is effective to stabilize tensile strength in water. The anionic surfactant includes alkylether carboxylate ("VIEW LIGHT EAC" manufactured by Sanyo Chemical Industries, Ltd.) and the like as carboxylate; dialkyl sulfosuccinate ("SANSEPARA 100" manufactured by Sanyo Chemical Industries, Ltd.), alkyl allyl sulfosuccinate, alkyl sulfoacetate, α-olefin sulfonate and the like as a sulfonate; alkyl allysulfate and alkyl ethersulfate as a sulfate salt; alkylether phosphorate and the like as phosphoric ester salt. Most preferably, dialkyl sulfosuccinate or alkyl allyl sulfosuccinate is used since it does not accelerate gelation of the resin when a surfactant is added to the resin. The anionic surfactant is preferably a monovalent or divalent metallic salt or ammonium salt, more preferably a sodium salt.

Although the surfactant may be mixed with any component contained in the binder or dissolved in a reactive monomer or a solvent, it is preferable to mix it with a resin. The amount of the surfactant to be used is not particularly limited, but it is preferable to be less than 30% by weight in view of binding strength.

The aggregate usable in the present invention includes artificial aggregates such as a magnesia clinker, glass beads, ceramic and rigid plastics, and natural aggregates such as siliceous stone, marble, granite, siliceous sand and silica sand. Further, fibers such as glass fibers, carbon fibers and steel fibers can be employed.

The filler employable in the present invention includes silica sand, siliceous sand, siliceous powder, calcium carbonate, gypsum, glass flake, mica, volcanic ash, SIRASU (white ash), silastic microballoons, concrete powder, expanded concrete powder, glass microballoons, hollow glass, fly ash, carbon black, alumina, iron, aluminum, silica and the like.

The thixotropic agent employable in the present invention includes fine powder silica (trade name of AEROSIL), non-powder alumina, talc, asbestos, colloidal wet aluminum silicate/organic composite (trade name of ORVEN), bentonite, castor oil derivatives and the like.

However, when the above-listed diluent, aggregate, filler, thixotropic agent and the like are mixed with a binder, they need to be added considering that the organic oxide deteriorates stability.

The binder of the present invention may be used by putting it in a container. Such a container may be one which does not brake while carrying or storing and can be sealed so as not to leak the binder. It is made of glass, pottery, synthetic resin, paper, metal and the like, and is in the shape of a capsule, a cartridge, a can, a packet and the like. In this case, the shape and material of the container may be suitably selected according to the use, i.e., capsule type or charging type. The container for a curing agent is preferably selected according to the property of the curing agent to be employed in view of safety.

BEST MODE FOR CARRYING OUT THE INVENTION

Hereinafter, the present invention is illustrated in more detail by referring to Examples.

EXAMPLE 1

5 g of N,N-dihydroxyproyl-p-toluidine as an accelerator, 0.5 g of 2,6-di-t-butyl-p-crezol (BHT) as a polymerization inhibitor and 5 g of dioctylsulfosuccinate sodium as a surfactant were added to 500 g of a resin comprising 55% by weight of epoxy acrylate resin prepared by adding methacrylic acid to a bisphenol A type epoxy resin and 45% by weight of diethylene glycol dimethacrylate as a reactive monomer. The thus-obtained resin was subjected to a curing characteristic test and a heating test. In the same manner as the measurement of the curing characteristic at room temperature according to JIS K 6901, the curing characteristics were measured at 5°, 15° and 30° C. by adding a curing agent to the resin so that a weight ratio of the resin to the curing agent might be 100 to 5. The heating test was carried out by sealing a resin in a glass container (having an outer diameter of 17 mm and a length of 120 mm) and immersing the container in a constant temperature bath at 60° C., and the days counted until the resin was gelated.

Next, 50 g of siliceous sand No. 8 and 1 g of AEROSIL were added to 50 g of the above-obtained resin to prepare a main ingredient. Further, 5 g of siliceous sand No. 8 and 0.01 g of AEROSIL were added to 10 g of benzoyl paste peroxide (concentration of 40%) to prepare a curing agent. Using the thus-obtained main ingredient and curing agent, a tensile load was measured.

A concrete block having a size of 500×500×1000 mm$^3$ and compression strength of 210 kg/cm$^2$ was drilled with an electric hammer drill to make a hole having a size of 18 mm×100 mm (diameter×length). Cuttings were removed from the hole with a blower and those on the hole wall were removed with a nylon brush. Again, cuttings were removed using a blower to clean up the inside of the hole. Then, 3 g of the curing agent was mixed with 30 g of the preliminarily prepared main ingredient with stirring and charged into the hole. After a bolt of M16 (material SNB 7) was inserted into the hole and cured for one day, a tensile load was measured. Preliminarily, the concrete block, main ingredient, curing agent and bolt were adjusted to a measurement temperature shown in Table 1 in a large constant temperature bath. Then, the bolt was embedded in a constant temperature bath, cured and subjected to a measurement. The measurement was carried out using a tensile tester for an anchor bolt ANSER-5-III (manufactured by Asahi Chemical Industry Co., Ltd.). The results are shown in Table 1.

EXAMPLE 2

5 g of N,N-dihydroxyproyl-p-toluidine as an accelerator, 0.5 g of 2,6-di-t-butyl-p-crezol (BHT) as a polymerization inhibitor and 5 g of dioctylsulfosuccinate sodium as a surfactant were added to 500 g of a resin comprising 65% by weight of an epoxy acrylate resin prepared by adding methacrylic acid to a bisphenol A type epoxy resin and 35% by weight of diethylene glycol dimethacrylate as a reactive monomer. Using the thus-prepared resin, the curing characteristic test and heating test at 60° C. were carried out and a tensile load was measured according to Example 1. The results are shown in Table 1.

The tensile load was not measured since a bolt could not be laid at a high temperature and the resin did not cure at a low temperature due to too short of a minimum curing time (CT) and too low of a maximum exothermic temperature (Tmax).

EXAMPLE 3

5 g of N-p-tolyldiethanol amine as an accelerator, 0.5 g of 2,6-di-t-butyl-p-crezol (BHT) as a polymerization inhibitor and 5 g of dioctylsulfosuccinate sodium as a surfactant were added to 500 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the curing characteristic test and heating test at 60° C. were carried out and a tensile load was measured according to Example 1. The results are shown in Table 1.

EXAMPLE 4

1 g of N-p-tolyldiethanol amine as an accelerator and 0.05 g of 2,6-di-t-butyl-p-crezol (BHT) as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 5

1 g of N-p-tolyldiethanol amine as an accelerator and 0.05 g of hydroquinone as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 6

1 g of N-p-tolyldiethanol amine as an accelerator and 0.05 g of p-benzoquinone as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 7

1 g of N,N-dihydroxypropyl-p-toluidine as an accelerator and 0.05 g of 2,6-di-t-butyl-p-crezol as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 8

1 g of N,N-dihydroxypropyl-p-toluidine as an accelerator and 0.05 g of hydroquinone as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 9

1 g of N,N-dihydroxypropyl-p-toluidine as an accelerator and 0.05 ppm of p-benzoquinone as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 10

1 g of N,N-dihydroxypropyl-p-toluidine as an accelerator and 0.05 g of 2,6-di-t-butyl-p-crezol as a polymerization inhibitor were added to 100 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the heating test at 60° C. was carried out. The result is shown in Table 2.

EXAMPLE 11

1 g of N,N-dihydroxypropyl-p-toluidine as an accelerator and 0.05 g of 2,6-di-t-butyl-p-crezol as a polymerization inhibitor were added to 100 g of a resin comprising 40% by weight of an epoxy acrylate resin prepared by adding methacrylic acid to a bisphenol A type epoxy resin and 60% by weight of Monomer A of the dicyclopentadiene type compound represented by formula (1) (wherein $R_1$ is methyl, $R_2$ is ethyl, and n is 1) as a reactive monomer. Using the thus-prepared resin, the heating test at 60° C. was carried out. The result is shown in Table 2.

EXAMPLE 12

1 g of N,N-dihydroxypropyl-p-toluidine as an accelerator and 0.05 g of hydroquinone as a polymerization inhibitor were added to 100 g of a resin comprising 40% by weight of an epoxy acrylate resin prepared by adding methacrylic acid to a bisphenol A type epoxy resin and 60% by weight of Monomer A of the dicyclopentadiene type compound represented by formula (1) (wherein $R_1$ is methyl, $R_2$ is ethyl, and n is 1) as a reactive monomer. Using the thus-prepared resin, the heating test at 60° C. was carried out. The result is shown in Table 2.

EXAMPLE 13

1 g of N,N-dihydroxypropyl-p-toluidine as an accelerator and 0.05 g p-benzoquinone as a polymerization inhibitor were added to 100 g of a resin comprising 40% by weight of an epoxy acrylate resin prepared by adding methacrylic acid to a bisphenol A type epoxy resin and 60% by weight of Monomer A of the dicyclopentadiene type compound represented by formula (1) (wherein $R_1$ is methyl, $R_2$ is ethyl, and n is 1) as a reactive monomer. Using the thus-prepared resin, the heating test at 60° C. was carried out. The result is shown in Table 2.

EXAMPLE 14

1 g of N,N-dihydroxypropyl-p-toluidine as an accelerator and 0.05 g of 2,6-di-t-butyl-p-crezol as a polymerization inhibitor were added to 100 g of a resin comprising 40% by weight of an epoxy acrylate resin prepared by adding methacrylic acid to a bisphenol A type epoxy resin and 70% by weight of trimethylolpropane-trimethacrylate as a reactive monomer. Using the thus-prepared resin, the heating test at 60° C. was carried out. The result is shown in Table 2.

EXAMPLE 15

1 g of N,N-dihydroxypropyl-p-toluidine as an accelerator and 0.05 g of hydroquinone as a polymerization inhibitor were added to 100 g of a resin comprising 40% by weight of an epoxy acrylate resin prepared by adding methacrylic acid to a bisphenol A type epoxy resin and 70% by weight of trimethylolpropane-trimethacrylate as a reactive monomer. Using the thus-prepared resin, the heating test at 60° C. was carried out. The result is shown in Table 2.

EXAMPLE 16

1 g of N,N-dihydroxypropyl-p-toluidine as an accelerator and 0.05 g of p-benzoquinone as a polymerization inhibitor were added to 100 g of a resin comprising 40% by weight of an epoxy acrylate resin prepared by adding methacrylic acid to a bisphenol A type epoxy resin and 70% by weight of trimethylolpropane-trimethacrylate as a reactive monomer. Using the thus-prepared resin, the heating test at 60° C. was carried out. The result is shown in Table 2.

EXAMPLE 17

1 g of N,N-dihydroxypropyl-p-toluidine as an accelerator and 0.05 g of 2,6-di-t-butyl-p-crezol as a polymerization inhibitor were added to 100 g of a resin comprising 40% by weight of an epoxy acrylate resin prepared by adding methacrylic acid to a bisphenol A type epoxy resin and 60% by weight of triallyl trimellitic acid as a reactive monomer. Using the thus-prepared resin, the heating test at 60° C. was carried out. The result is shown in Table 2.

EXAMPLE 18

1 g of N,N-dihydroxypropyl-p-toluidine as an accelerator and 0.05 g of hydroquinone as a polymerization inhibitor were added to 100 g of a resin comprising 40% by weight of an epoxy acrylate resin prepared by adding methacrylic acid to a bisphenol A type epoxy resin and 60% by weight of triallyl trimellitic acid as a reactive monomer. Using the thus-prepared resin, the heating test at 60° C. was carried out. The result is shown in Table 2.

EXAMPLE 19

1 g of N,N-dihydroxypropyl-p-toluidine as an accelerator and 0.05 g of p-benzoquinone as a polymerization inhibitor were added to 100 g of a resin comprising 40% by weight of an epoxy acrylate resin prepared by adding methacrylic acid to a bisphenol A type epoxy resin and 60% by weight of triallyl trimellitic acid as a reactive monomer. Using the thus-prepared resin, the heating test at 60° C. was carried out. The result is shown in Table 2.

Comparative Example 1

5 g of N,N-dimethylaniline, which does not contain a hydroxyl group in a nitrogen substituent, as an accelerator, 0.25 g of p-benzoquinone as a polymerization inhibitor and 5 g of dioctyl sulfosuccinate sodium as a surfactant were added to 500 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the curing characteristic test and heating test at 60° C. were carried out and a tensile load was measured according to Example 1. The results are shown in Table 1.

Comparative Example 2

5 g of N,N-dimethylaniline, which does not contain a hydroxyl group in a nitrogen substituent, as an accelerator, 0.25 g of hydroquinone as a polymerization inhibitor and 5 g of dioctyl sulfosuccinate sodium as a surfactant were added to 500 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the curing characteristic test and heating test at 60° C. were carried out according to Example 1. The results are shown in Table 1.

The tensile load was not measured since a bolt could not be laid at a high temperature and the resin did not cure at a low temperature due to too short of a minimum curing time (CT) and too low of a maximum exothermic temperature (Tmax).

Comparative Example 3

5 g of N,N-dimethylaniline, which does not contain a hydroxyl group in a nitrogen substituent, as an accelerator, 5 g of dioctyl sulfosuccinate sodium as a surfactant and 0.5 g of crezols, 2,6-di-t-butyl-p-crezol, as a polymerization inhibitor were added to 500 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the curing characteristic test and heating test at 60° C. were carried out according to Example 1. The results are shown in Table 1.

The tensile load was not measured since a bolt could not be laid at a high temperature and the resin did not cure at a low temperature due to too short of a minimum curing time (CT) and too low of a maximum exothermic temperature (Tmax).

Comparative Example 4

3 g of N,N-dimethyl-p-toluidine, which does not contain a hydroxyl group in a nitrogen substituent, as an accelerator, 0.5 g of p-benzoquinone as a polymerization inhibitor and 5 g of dioctyl sulfosuccinate sodium as a surfactant were added to 500 g of a resin comprising 55% by weight of an epoxy acrylate resin prepared by adding methacrylic acid to a bisphenol A type epoxy resin and 45% by weight of diethylene glycol dimethacrylate as a reactive monomer. Using the thus-prepared resin, the curing characteristic test and heating test at 60° C. were carried out according to Example 1. The results are shown in Table 1.

The tensile load was not measured since a bolt could not be laid at a high temperature and the resin did not cure at a low temperature due to too short of a minimum curing time (CT) and too low of a maximum exothermic temperature (Tmax).

Tables 1 and 2 show that a curing speed cannot be controlled with polymerization inhibitors such as a tertiary amine or cresol type polymerization inhibitors which do not contain a hydroxyl group in a nitrogen substituent as in Comparative Examples 2 to 4. If curing speed cannot be controlled, the curing period of a binder becomes short under the high temperature circumstances such as in summertime. As a result, a bolt and the like cannot be inserted because the binder is cured while mixing or charging. Since the resins obtained in Comparative Examples 1 to 4 have a low maximum exothermic temperature at curing, the binder containing the resins is poor in curing properties under low temperature circumstances such as in wintertime and does not exhibit tensile strength. On the other hand, the curing speed of the binders obtained in the Examples is controllable so that the above-mentioned problems do not occur. Further, as apparent from the heating test at 60° C., the resins employed in the Examples take 28 days or more to be gelated. This means the resins have excellent stability and a long shelf life.

INDUSTRIAL APPLICABILITY

The binder of the present invention is advantageous in fixing fastening parts such as an anchor bolt in a hole drilled to a base such as a concrete and a rock.

The binder of the present invention is less harmful since it does not contain a styrene monomer. Further, comparing to the conventional binders, it exhibits higher fixing strength and excellent stability under severe conditions.

TABLE 1

| | Accelerator | Polymerization Inhibitor | Reactive Monomer | Measurement Temperature | Curing Property | | | Tensile Load | | Heating Test at 60° C. |
| | | | | | | | | Maximum Tensil | | |
| | | | | | GT | CT | Tmax | Strength | Breaking Form | Gelated Day |
|---|---|---|---|---|---|---|---|---|---|---|
| Ex. 1 | N,N-dihydroxy- | 2,6-di-t-butyl-p- | 45% | 5° C. | 43 min. | 45 min. | 105° C. | 6.7 ton | Cone Breaking | 41 days |

TABLE 1-continued

| | Accelerator | Polymerization Inhibitor | Reactive Monomer | Measurement Temperature | Curing Property GT | CT | Tmax | Tensile Load Maximum Tensil Strength | Breaking Form | Heating Test at 60° C. Gelated Day |
|---|---|---|---|---|---|---|---|---|---|---|
| | propyl-p-toluidine 1.0% | cresol 1000 ppm | | 15° C. 30° C. | 15 min. 5 min. | 16 min. 6 min. | 134° C. 160° C. | 6.4 ton 6.5 ton | Cone Breaking Cone Breaking | |
| Ex. 2 | N,N-dihydroxy-propyl-p-toluidine 1.0% | 2,6-di-t-butyl-p-cresol 1000 ppm | 35% | 5° C. 15° C. | 42 min. 14 min. | 45 min. 15 min. | 65° C. 110° C. | 6.2 ton 6.4 ton | Cone Breaking Cone Breaking | 39 days |
| Ex. 3 | N-p-tolyldiethanol amine 1.0% | 2,6-di-t-butyl-p-cresol 1000 ppm | 45% | 15° C. | 10 min. | 11 min. | 143° C. | 6.0 ton | Cone Breaking | 30 days |
| Comp. Ex. 1 | N,N-dimethyl aniline 1.0% | p-benzoquinone 500 ppm | 45% | 5° C. 15° C. | 13 min. | 50 min. 14 min. | 10° C. 82° C. | 0.0 ton 5.4 ton | Adhere Breaking Cone Breaking | 7 days |
| Comp. Ex. 2 | N,N-dimethyl aniline 1.0% | hydroquinone 500 ppm | 45% | 15° C. | 5 min. | 8 min. | 57° C. | | | 4 days |
| Comp. Ex. 3 | N,N-dimethyl aniline 1.0% | 2,6-di-t-butyl-p-cresol 2000 ppm | 45% | 15° C. | 3 min. | 5 min. | 87° C. | | | 5 days |
| Comp. Ex. 4 | N,N-dimethyl-p-toluidine 0.6% | p-benzoquinone 500 ppm | 45% | 15° C. | 3 min. | 5 min. | 62° C. | | | 5 days |

*Curing property: according to JIS K 6901
*Tensile strength in Comparative Examples 2 to 4: not cured at 5° C. and poor laying at 30° C.
*Heating test at 60° C.: the days a resin in a sealed glass tube takes to be gelated at 60° C.

TABLE 2

| | Resin Type | Reactive Monomer | Accelerator | Polymerization Inhibitor | Heating Test at 60° C. Gelated Day |
|---|---|---|---|---|---|
| Example 4 | methacryl type epoxy acrylate | diethylene glycol methacrylate | N-p-tolyl diethanol amine | 2,6-di-t-butyl-t-cresol | 28 days |
| Example 5 | methacryl type epoxy acrylate | diethylene glycol methacrylate | N-p-tolyl diethanol amine | hydroquinone | 28 days |
| Example 6 | methacryl type epoxy acrylate | diethylene glycol methacrylate | N-p-toIyl diethanol amine | p-benzoquinone | 28 days |
| Example 7 | methacryl type epoxy acrylate | diethylene glycol methacrytate | N,N-dihydroxypropyl-p-toluidine | 2,6-di-t-butyl-t-cresol | 41 days |
| Example 8 | methacryl type epoxy acrylate | diethylene glycol methacrylate | N,N-dihydroxypropyl-p-toluidine | hydroquinone | 36 days |
| Example 9 | methacryl type epoxy acrylate | diethylene glycol methacrylate | N,N-dihydroxypropyl-p-toluidine | p-benzoquinone | 41 days |
| Example 10 | acryl type epoxy acrylate | diethylene glycol methacrylate | N,N-dihydroxypropyl-p-toluidine | 2,6-di-t-butyl-t-cresol | 60 days or more |
| Example 11 | acryl type epoxy acrylate | dicyclopentadiene type compound | N,N-dihydroxypropyl-p-toluidine | 2,6-di-t-butyl-t-cresol | 60 days or more |
| Example 12 | acryl type epoxy acrylate | dicyclopentadiene type compound | N,N-dihydroxypropyl-p-toluidine | hydroquinone | 36 days |
| Example 13 | acryl type epoxy acrylate | dicyclopentadiene type compound | N,N-dihydroxypropyl-p-toluidine | p-benzoquinone | 48 days |
| Example 14 | acryl type epoxy acrylate | trimethylolpropane trimethacrylate | N,N-dihydroxypropyl-p-toluidine | 2,6-di-t-butyl-t-cresol | 60 days or more |
| Example 15 | acryl type epoxy acrylate | trimethylolprnpane trimethacrylate | N,N-dihydroxypropyl-p-toluidine | hydroquinone | 60 days or more |
| Example 16 | acryl type epoxy acrylate | trimethylolpropane trimethacrylate | N,N-dihydroxypropyl-p-toluidine | p-benzoquinone | 60 days or more |
| Example 17 | acryl type epoxy acrylate | triallyl trimellitic acid | N,N-dihydroxypropyl-p-toluidine | 2,6-di-t-butyl-t-cresol | 60 days or more |
| Example 18 | acryl type epoxy acrylate | triallyl trimellitic acid | N,N-dihydroxypropyl-p-toluidine | hydroquinone | 60 days or more |
| Example 19 | acryl type epoxy acrylate | triallyl trimellitic acid | N,N-dihydroxypropyl-p-toluidine | p-benzoquinone | 60 days or more |

*Examples 11 to 13: dicychlopentadiene type compound (represented by formula (1) wherein $R_1$ is methyl, $R_2$ is ethyl and n is 1)
*Heating test at 60° C.: the days a resin in a sealed glass tube takes to be gelated at 60° C.

We claim:

1. A binder for a building structure comprising a main ingredient, a curing agent and an accelerator for the main ingredient; the main ingredient being an epoxy acrylate resin diluted with a reactive monomer comprising a multifunctional ester of carboxylic acid and alcohol, at least one of which contains a reactive double bond; the curing agent being an organic peroxide; and the accelerator of the main ingredient being tertiary aromatic amines containing a hydroxyl group in a nitrogen substituent.

2. The binder for building structure according to claim 1, wherein the epoxy acrylate resin is a methacryl type epoxy acrylate resin.

3. The binder for building structure according to claim 1 or 2, wherein the accelerator is N,N-dihydroxypropyl-p-toluidine.

4. The binder for building structure according to claim 1 or 2, wherein the reactive monomer is an ester comprising methacrylic acid and/or acrylic acid and a divalent and/or a trivalent alcohol.

5. The binder for building structure according to claim 1 or 2, wherein the reactive monomer is an ester comprising allyl alcohol and/or methacryl alcohol and a divalent and/or a trivalent carboxylic acid.

6. The binder for building structure according to claim 1 or 2, wherein the reactive monomer is contained in an amount of 30 to 70% by weight, based on the epoxy acrylate resin.

* * * * *

UNITED STATES PATENT AND TRADEMARK OFFICE
CERTIFICATE OF CORRECTION

PATENT NO. : 6,015,845
DATED : January 18, 2000
INVENTOR(S) : Yonetani et al.

It is certified that error appears in the above-identified patent and that said Letters Patent is hereby corrected as shown below:

On the title page, delete item:

"[30] Foreign Application Priority Data", because foreign priority was not claimed.

Signed and Sealed this

Thirteenth Day of February, 2001

Attest:

NICHOLAS P. GODICI

*Attesting Officer*   *Acting Director of the United States Patent and Trademark Office*